(12) United States Patent
Tsuchikiri et al.

(10) Patent No.: US 7,707,863 B2
(45) Date of Patent: May 4, 2010

(54) IGNITION SWITCH DEVICE

(75) Inventors: Akihiko Tsuchikiri, Hamamatsu (JP); Takehiro Sakai, Sakai (JP); Masaaki Ueda, Sakai (JP); Keisuke Miura, Sakai (JP); Hiroshi Kawanami, Sakai (JP)

(73) Assignees: Asahi Denso Co., Ltd., Hamamatsu-shi (JP); Kubota Corporation, Osaka (JP)

( * ) Notice: Subject to any disclaimer, the term of this patent is extended or adjusted under 35 U.S.C. 154(b) by 27 days.

(21) Appl. No.: 12/128,205

(22) Filed: May 28, 2008

(65) Prior Publication Data

US 2008/0296468 A1 Dec. 4, 2008

(30) Foreign Application Priority Data

May 28, 2007 (JP) .............................. 2007-140471

(51) Int. Cl.
*E05B 17/18* (2006.01)
(52) U.S. Cl. .............................. 70/252; 70/423; 70/455; 70/DIG. 30
(58) Field of Classification Search ............ 70/252, 70/423–428, 453–455, 54–56, DIG. 43, DIG. 30, 70/DIG. 56
See application file for complete search history.

(56) References Cited

U.S. PATENT DOCUMENTS

| | | | | | |
|---|---|---|---|---|---|
| 1,088,237 | A | * | 2/1914 | Mulford | 70/454 |
| 1,112,485 | A | * | 10/1914 | Snyder | 70/452 |
| 1,206,611 | A | * | 11/1916 | Strode | 70/427 |
| 1,718,723 | A | * | 6/1929 | Williams | 70/38 A |
| 1,904,882 | A | * | 4/1933 | Prior, Jr. | 70/1.5 |
| 2,355,300 | A | * | 8/1944 | Johnstone | 70/455 |
| 2,388,228 | A | * | 10/1945 | Johnstone | 70/455 |
| 2,400,229 | A | * | 5/1946 | Freeman | 70/455 |
| 2,439,978 | A | * | 4/1948 | Konchan | 70/455 |
| 2,562,038 | A | * | 7/1951 | Jacobi | 70/455 |
| 2,602,319 | A | * | 7/1952 | Jacobi | 70/455 |
| 2,658,151 | A | * | 11/1953 | Heinz | 250/466.1 |

(Continued)

FOREIGN PATENT DOCUMENTS

CN 2854004 Y 1/2007

(Continued)

OTHER PUBLICATIONS

Office Action issued in counterpart Chinese Application No. 2008101001788 dated Oct. 23, 2009.

*Primary Examiner*—Lloyd A Gall
(74) *Attorney, Agent, or Firm*—Sughrue Mion, PLLC

(57) ABSTRACT

An ignition switch device is provided with a switching device 2 having a key hole 2a, and capable of being rotationally operated in a predetermined direction with an ignition key K inserted to start and stop the engine of an industrial machine, a case 3 covering the switching device 2 and formed with an insertion hole 3b allowing the key hole 2a to face the outside, a shutter 4 rotatable between a closed position where the insertion hole 3b of the case 3 is closed, and an open position where the insertion hole 3b is opened to allow the key hole 2a to face outside, and a protruding portion 7 formed within the range of rotation of the shutter 4 while protruding from the surface 3a of the case 3 and whose protruding end contacts the rear surface 4b of the shutter 4 while the shutter 4 rotates.

7 Claims, 5 Drawing Sheets

U.S. PATENT DOCUMENTS

| | | | |
|---|---|---|---|
| 2,660,877 A * | 12/1953 | Malouf | 70/455 |
| 2,702,468 A * | 2/1955 | Spain | 70/455 |
| 2,993,362 A * | 7/1961 | Baccolla | 70/454 |
| 3,564,744 A * | 2/1971 | Shook | 40/594 |
| 3,564,880 A * | 2/1971 | Kwasiborski | 70/255 |
| 3,583,185 A * | 6/1971 | Jacobi | 70/455 |
| 3,930,391 A * | 1/1976 | Borlinghaus | 70/455 |
| 4,231,240 A * | 11/1980 | Fujita et al. | 70/173 |
| 4,586,355 A * | 5/1986 | Lee et al. | 70/455 |
| 4,723,428 A * | 2/1988 | Yamaguchi | 70/455 |
| 4,773,242 A * | 9/1988 | Smith | 70/455 |
| 5,477,713 A * | 12/1995 | Lay | 70/454 |
| 5,680,095 A * | 10/1997 | Nassouri | 340/426.28 |
| 5,718,137 A * | 2/1998 | Huston | 70/423 |
| 6,272,890 B1 * | 8/2001 | Huston | 70/423 |
| 7,322,218 B2 * | 1/2008 | Yonemura et al. | 70/162 |
| 7,401,484 B1 * | 7/2008 | Holmes et al. | 70/423 |
| 2005/0193788 A1 * | 9/2005 | Weiner | 70/454 |

FOREIGN PATENT DOCUMENTS

| | | |
|---|---|---|
| CN | 2900303 Y | 5/2007 |

* cited by examiner

IGNITION SWITCH DEVICE

This application claims foreign priority from Japanese Patent Application No. 2007-140471 filed on May 28, 2007, the entire contents of which are hereby incorporated by reference.

BACKGROUND OF THE INVENTION

1. Field of the Invention

The present invention relates to an ignition switch device which is disposed in a driver's seat of an industrial machine to start and stop an engine of the industrial machine.

2. Background Art

An industrial machine, for example, a construction machine is used in a worksite of engineering works and construction, and includes bulldozers, power shovels, and crane vehicles. An ignition switch device for starting and stopping an engine of the industrial machine is disposed in the driver's seat of such an industrial machine. By rotationally operating an ignition key while inserting the key into a key hole of such an ignition switch device, the engine is started and stopped.

The industrial machine is typically used in the open air in a construction site. Thus, conventionally, in order to prevent muddy water, dust, etc. from entering the key hole, it is desirable that the key hole is provided with a shutter. The shutter is brought into a closed state where it covers the key hole, for example, in the surface of the case. In this state, the shutter can prevent muddy water, dust, etc. from entering the keyhole. In the starting operation or stopping operation of the engine, the shutter is rotated about a rotary shaft on the surface of the case to allow the key hole to face the outside so that the ignition key can be inserted into the key hole. In addition, since such prior art is not related to inventions well-known in literatures, there is no information on prior art documents to be described.

However, in a case where the shutter is simply provided in the above conventional ignition switch device, there is a problem in that, when the shutter is rotated on the surface of the case, scratches are apt to be given to the surface, and the design quality of appearance is impaired. That is, since it is necessary to rotate the shutter while the rear surface of the shutter is made to contact the surface of the case, streaky scratches or the like are apt to be given along a locus of rotation.

In addition, if the shutter is rotated while the rear surface of the shutter is spaced apart from the surface of the case, the scratches as described above will not be given. In this case, however, it is necessary to support the shutter rotatably in a state where the shutter is floated from the surface of the case, and there is a possibility that smooth rotation of the shutter may not be performed due to generation of a gutter or the like. Accordingly, it is necessary to make the rear surface of the shutter contact the surface of the case, and a problem that scratches are given to the surface of the case occurs.

SUMMARY OF THE INVENTION

One or more embodiments of the invention provide an ignition switch device which allows smooth rotation of a shutter to be performed, and which can keep the surface of a case from being scratched, thereby maintaining design quality.

In accordance with a first aspect of the invention, an ignition switch device disposed in a driver's seat of an industrial machine to start and stop an engine of the industrial machine is provided with: a switching means having a key hole allowing a regular ignition key to be inserted thereinto, and capable of being rotationally operated in a predetermined direction with the ignition key inserted to start and stop the engine of the industrial machine; a case covering the switching means and formed with an insertion hole allowing the key hole to face the outside; a shutter disposed on the surface of the case, and rotatable between a closed position where the insertion hole of the case is closed, and an open position where the insertion hole is opened to allow the key hole to face outside; and a protruding portion formed within the range of rotation of the shutter while protruding from the surface of the case and whose protruding end contacts a rear surface of the shutter while the shutter rotates.

In accordance with a second aspect of the invention, in the ignition switch device of the first aspect, the protruding portion may be formed such that its protruding end is sharpened.

In accordance with a third aspect of the invention, in the ignition switch device of the first or second aspect, a convex shape may be formed along a contour edge of the rear surface of the shutter.

In accordance with a fourth aspect of the invention, in the ignition switch device of any one of first to third aspects, the protruding portion may be formed so as to extend in an arc along the locus of rotation of the shutter.

According to the first aspect, the ignition switch device provided with the protruding portion which is formed within the range of rotation of the shutter while protruding from the surface of the case and whose protruding end contacts a rear surface of the shutter while the shutter rotates. Thus, smooth rotation of the shutter can be performed, and the surface of the case can be kept from being scratched, thereby maintaining design quality. That is, during the rotation of the shutter, the rear surface of the shutter will contact only the protruding end of the protruding portion. As a result, a place to which any scratches are given will be limited, and the scratches will not be conspicuous. Therefore, the design quality of the surface of the case can be maintained.

Further, according to the second aspect, the protruding portion is formed such that its protruding end is sharpened. Thus, during the rotation of the shutter, the rear surface of the shutter will contact only the sharpened protruding end of the protruding portion. As a result, a place where any scratches are given will be limited, and will not be conspicuous. Therefore, the design quality of the surface of the case can be maintained more reliably.

According to the third aspect, the convex shape is formed along the contour edge of the rear surface of the shutter. Thus, while the shutter rotates, only the convex shape of the shutter and the protruding end of the protruding portion will contact each other. As a result, the contact area therebetween can be reduced to further keep the rear surface of the case from being scratched. Further, when the rear surface of the shutter freezes during a winter season, only the convex shape of the shutter and the protruding end of the protruding portion contact each other, the contact area therebetween is small and the frozen place is extremely limited. Thus, the shutter can be rotated with slight force.

According to the fourth aspect, the protruding portion is formed so as to extend in an arc along the locus of rotation of the shutter. Thus, a three-dimensional design can be provided so as to indicate the rotation direction of the shutter, and the rotational operation of the shutter can be made smoother.

Other aspects and advantages of the invention will be apparent from the following description, the drawings and the claims.

REFERENCE NUMERALS

1: IGNITION SWITCH DEVICE
2: SWITCHING MEANS
2a: KEY HOLE
3: CASE
3a: SURFACE
3b: INSERTION HOLE
4: SHUTTER
4a: CUTOUT
4b: REAR SURFACE
4c: CONVEX SHAPE
5: MAIN GUIDE SHAPE
6: AUXILIARY GUIDE SHAPE
7: PROTRUDING PORTION
K: IGNITION KEY

DETAILED DESCRIPTION OF THE EXEMPLARY EMBODIMENTS

Figure 1:
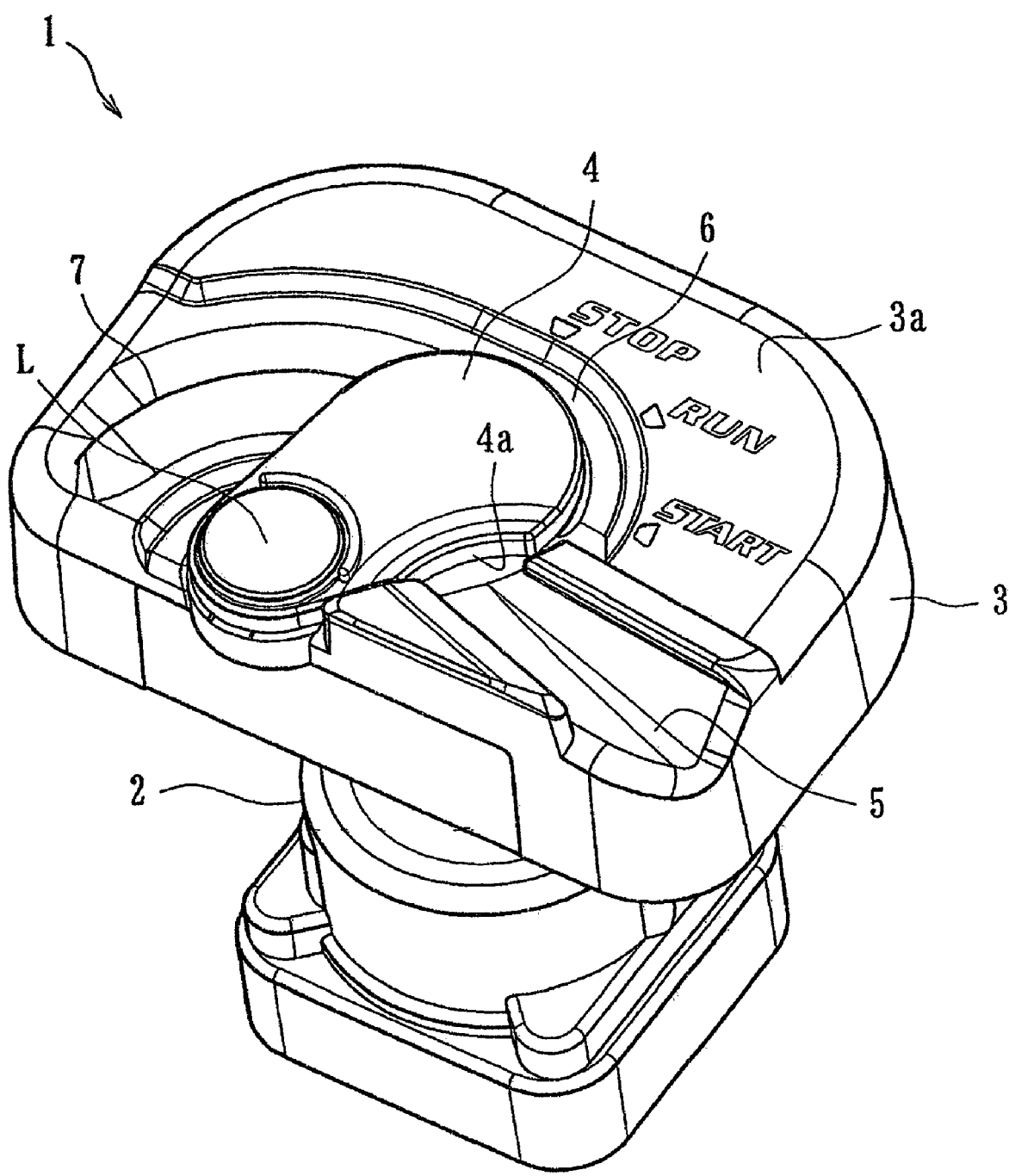
FIG. 1 is a perspective view showing an ignition switch device of an embodiment of the invention.

An exemplary embodiment of the invention will be specifically explained with reference to the drawings. An ignition switch device related to the present embodiment is disposed in driver's seats of industrial machines (construction machines), such as bulldozers, power shovels, or crane vehicles to be used in worksites of engineering works or construction. As shown in FIG. 1, the ignition switch device is mainly composed of a switching means 2, a case 3, a shutter 4, a main guide shape 5, an auxiliary guide shape 6, and a protruding portion 7.

The switching means 2 includes a key hole 2a (refer to FIG. 3) which allows a regular ignition key K to be inserted thereinto, and can be operated to rotate in a predetermined direction with the ignition key K inserted thereinto to thereby start and stop the engine of an industrial machine. Specifically, the switching means 2 constitutes a cylinder lock in which a plurality of tumblers are provided within the key hole 2a, or a versatile ignition switch including a switch board or the like which can be switched by forming or breaking a predetermined electric circuit by the rotation of the cylinder lock.

Figure 4:
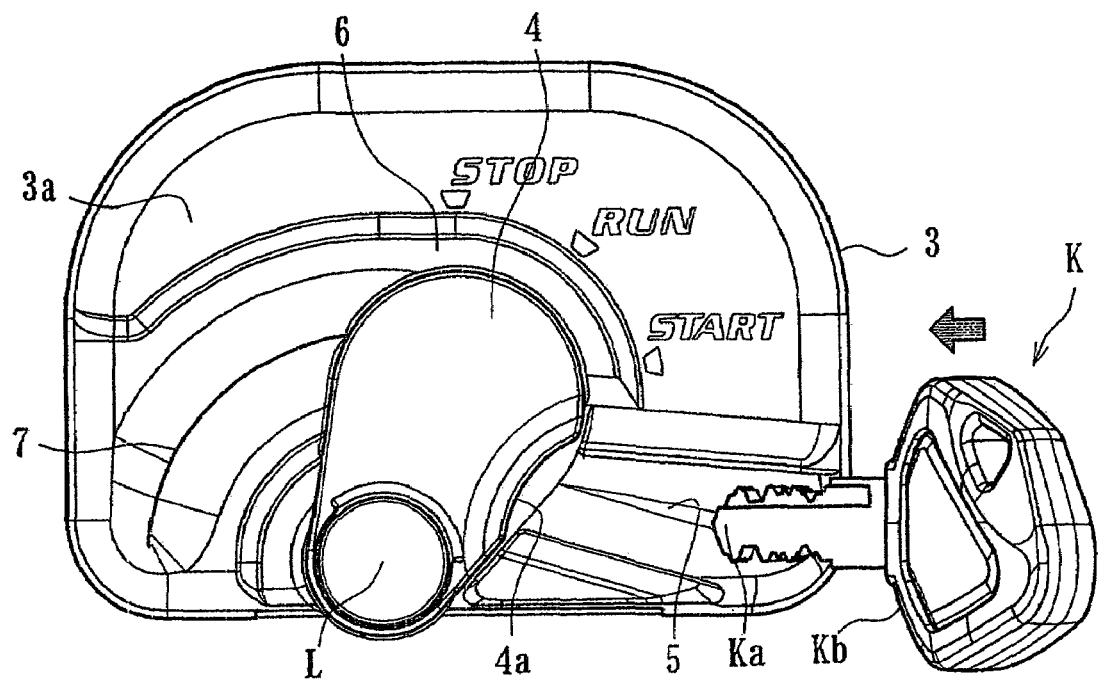
FIG. 4 is a view as seen from the upper surface in the ignition switch device, and is a view showing a process in which an ignition key is guided by a main guide shape.

The ignition key K, as shown in FIG. 4, is formed in the shape of a key while its tip (protruding end) Ka is formed in the shape of V, and is configured such that, if the ignition key is a regular one, the shape of the key matches the shape of the tumblers of the cylinder lock in the switching means 2 so that the cylinder lock can be rotated. In addition, reference numeral Kb denotes a gripping portion of the ignition key K, and a driver grips the gripping portion Kb to operate the ignition key K.

The case 3 is formed with an insertion hole 3b which allows the key hole 2a to face outside while covering an upper portion of the switching means 2, and printed letters or the like which indicate the position of the ignition key K is given to a surface 3a of the case. Further, the case 3 is a resin-molded product obtained by molding predetermined resin (PBT or the like), and various shapes, such as the main guide shape 5, the auxiliary guide shape 6, and the protruding portion 7, which will be explained in detail, are built in the surface of the case at the time of manufacture.

Figure 2:
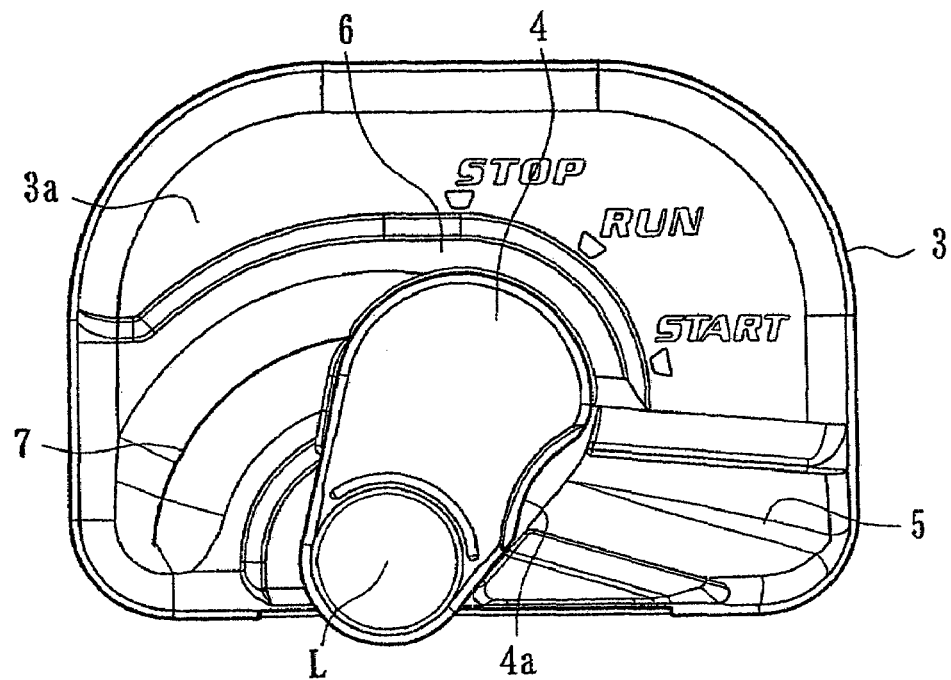
FIG. 2 is a plan view showing the ignition switch device (a shutter is in a closed position).
Figure 3:
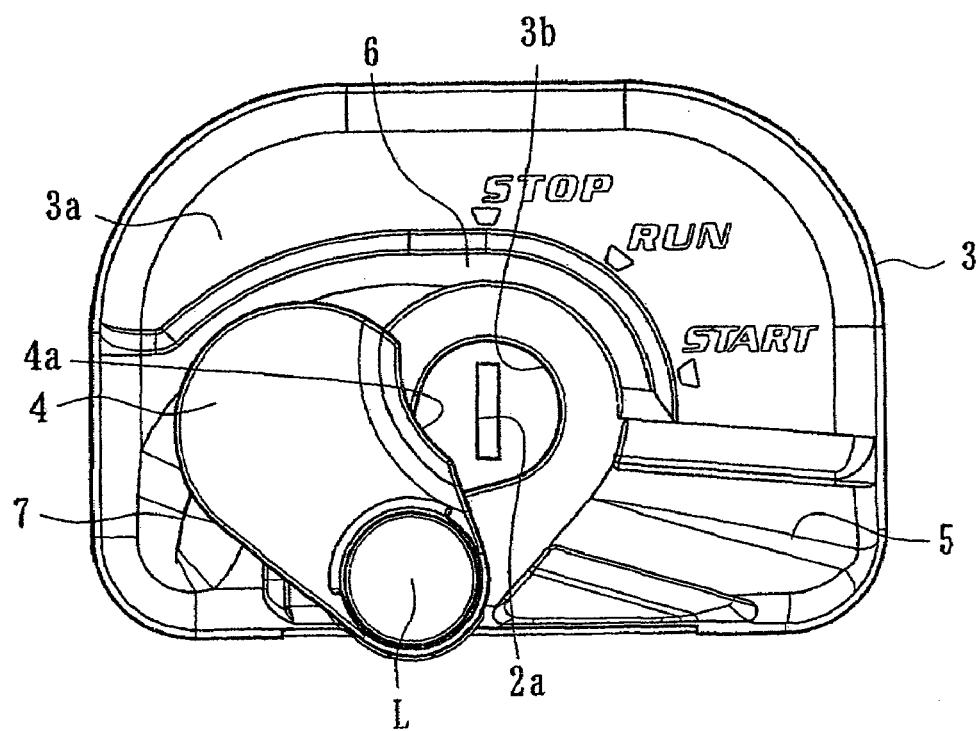
FIG. 3 is a plan view showing the ignition switch device (the shutter is in an open position).

The shutter 4 is made of metal or resin disposed on the surface 3a of the case 3. As shown in FIGS. 2 and 3, the shutter is adapted to be rotatable about a rotary shaft L between a closed position (position shown in FIG. 2) where the insertion hole 3b of the case 3 is closed, and an open position (position shown in FIG. 3) where the insertion hole 3b is opened to allow the key hole 2a to face the outside (the upside). Thereby, when such a shutter 4 is in the closed position, the shutter can cover the key hole 2a to prevent muddy water, dust, etc. from entering the key hole.

Further, the shutter 4 is biased in a direction in which the shutter is always in the closed position by a spring (torsion coil spring or the like biased toward the closed position) which is not shown. When the ignition key K is pulled out, the shutter 4 in the open position is rotated to the closed position and is naturally closed by the biasing force of the spring. Thereby, after the ignition key K is pulled out of the keyhole 2a, the operation which closes the shutter 4 becomes unnecessary, and consequently, operability can be further improved.

As shown in FIGS. 1 and 4, the main guide shape 5 is composed of a groove having a V-shaped cross-section, which is formed in the surface 3a of the case 3, and extends toward the insertion hole 3b (strictly speaking, cutout 4a of the shutter 4 which covers the insertion hole 3b) so that it can guide the tip Ka of the ignition key K to the key hole 2a. The main guide shape 5 extends substantially linearly to the insertion hole 3b from the edge of the case 3, and is configured such that its width becomes narrow toward the insertion hole 3b from the edge.

As shown in FIG. 1, the auxiliary guide shape 6 is formed on the surface 3a of the case 3 along a contour edge of the shutter 4, and extends toward the main guide shape 5 so that it can guide the tip Ka of the ignition key K to the main guide shape 5. That is, an upper (the side where printed letters are given) contour edge in the shutter 4 is formed in a circular arc as shown in the drawing, and the tip of the auxiliary guide shape communicates with the main guide shape 5 while the auxiliary guide shape 6 is formed along such a circular arc. Thus, if the tip Ka of the ignition key K is moved along the auxiliary guide shape 6, it reaches the main guide shape 5 from which it can be guided to the insertion hole 3b as described above.

Figure 5:
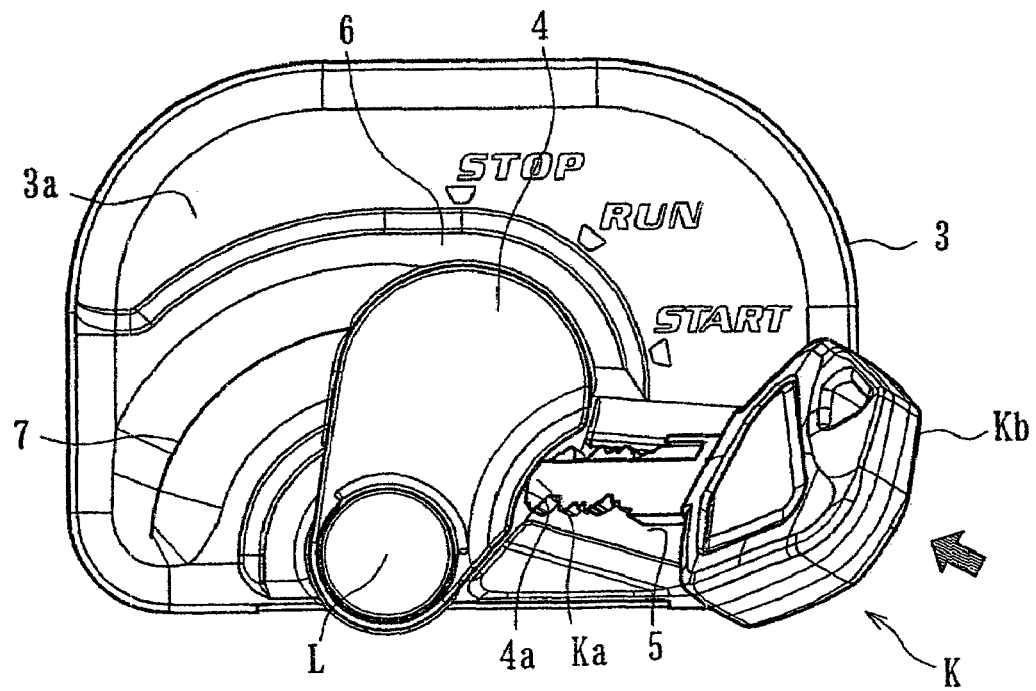
FIG. 5 is a view as seen from the upper surface in the ignition switch device, and is a view showing a state in which the ignition key guided by the main guide shape has abutted on a cutout of the shutter.

Meanwhile, a circular-arc cutout 4a which allows the tip Ka of the ignition key K guided by the main guide shape 5 to abut thereon is formed in a position on an extension of the main guide shape 5 of the shutter 4. Also, as shown in FIG. 5, if the tip Ka of the ignition key K guided by the main guide shape 5 is made to abut on the cutout 4a, and thereafter further moved in this direction, the tip Ka presses the shutter 4 via the cutout 4a so that the shutter 4 can be rotated about the rotary shaft L.

Figure 6:
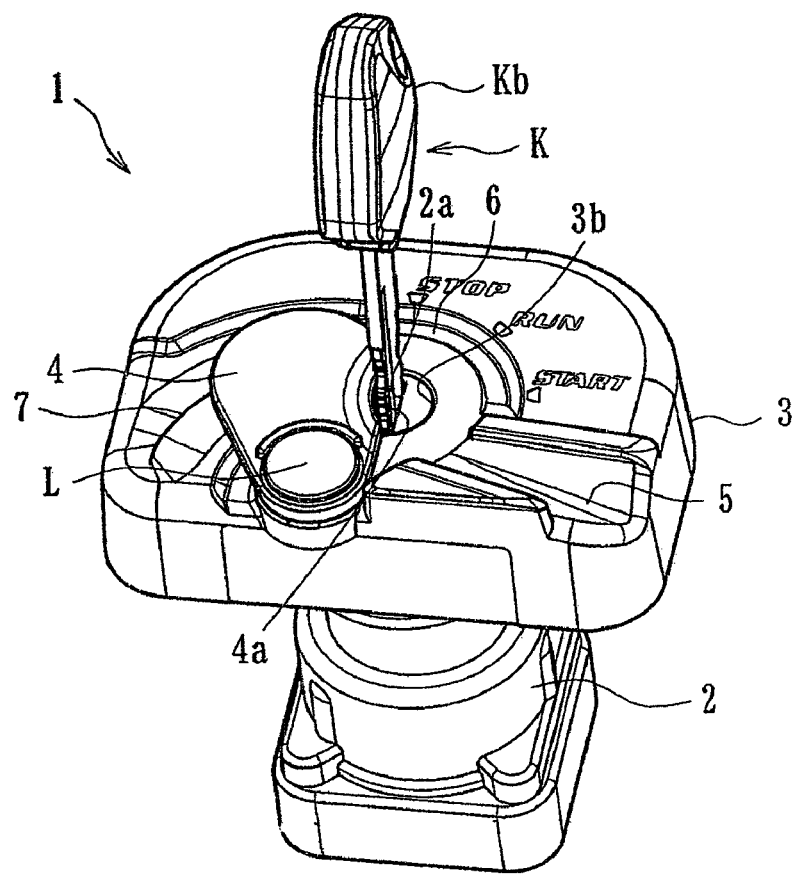
FIG. 6 is a perspective view showing a state where the ignition key has matched a key hole in the ignition switch device.

Here, in the present embodiment, during the rotation of the shutter 4, the cutout 4a and the key hole 2a are set so as to be parallel to each other, and the tip Ka of the ignition key K which is pressing the cutout 4a is configured so as to match the formation position of the key hole 2a. Thus, while the shutter 4 is rotated to the open position by the tip Ka of the ignition key K, as shown in FIG. 6, the tip Ka of the ignition key K will match the key hole 2a. If the ignition key K is pushed into the switching means 2 from this state, the key can be inserted into the key hole 2a.

Thereafter, if the ignition key K inserted into the key hole 2a is rotated in a predetermined direction (right direction in the present embodiment), the switching means 2 can be operated to start the engine of the industrial machine. Further, if the ignition key K is rotated in an opposite direction (left direction in the present embodiment) in order to stop the engine of the industrial machine, the switching means 2 can be operated to stop the engine.

In addition, since the shutter 4 is biased toward the closed position at the time of the rotation of the ignition key K as described above, the cutout 4a and the ignition key K are in an abutting state. However, since the cutout 4a is formed in a circular arc, the rotational operation of the ignition key K can be smoothly performed. Also, if the ignition key K is pulled out of the key hole 2a, as already mentioned, the shutter 4 will be rotated to the closed position and naturally closed by the biasing force of the spring.

Figure 7:
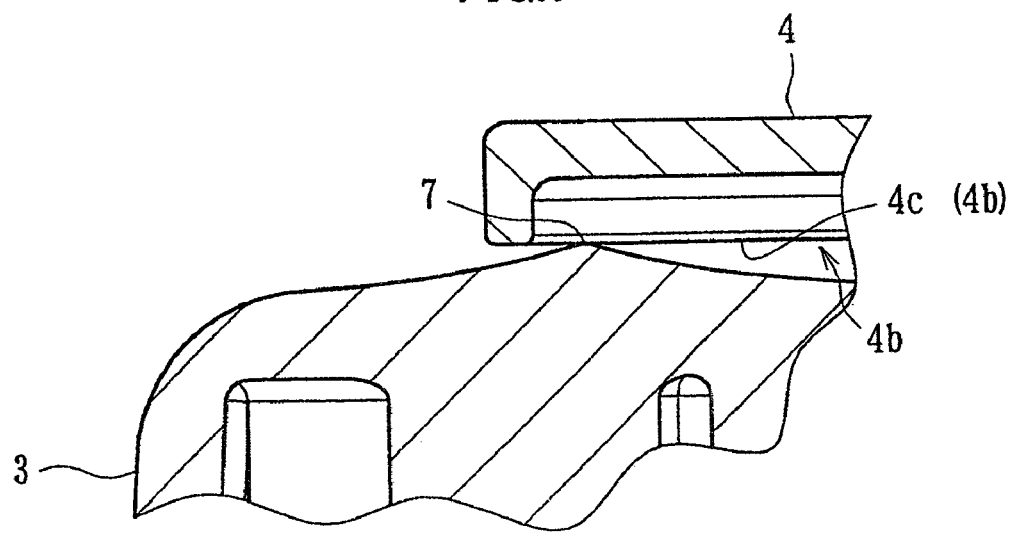
FIG. 7 is a sectional schematic view showing a contact state between the rear surface of the shutter and a protruding portion in the ignition switch device.

The protruding portion 7 is formed within the range of rotation of the shutter 4 while protruding from the surface 3a of the case 3, and as shown in FIG. 7, the protruding portion is set such that its protruding end contacts a rear surface 4b of the shutter 4 while the shutter 4 rotates. As shown in this drawing, the protruding portion 7 is formed such that its protruding end is sharpened, and is configured such that the contact surface thereof with the rear surface 4b of the shutter 4 becomes linear.

Figure 8:
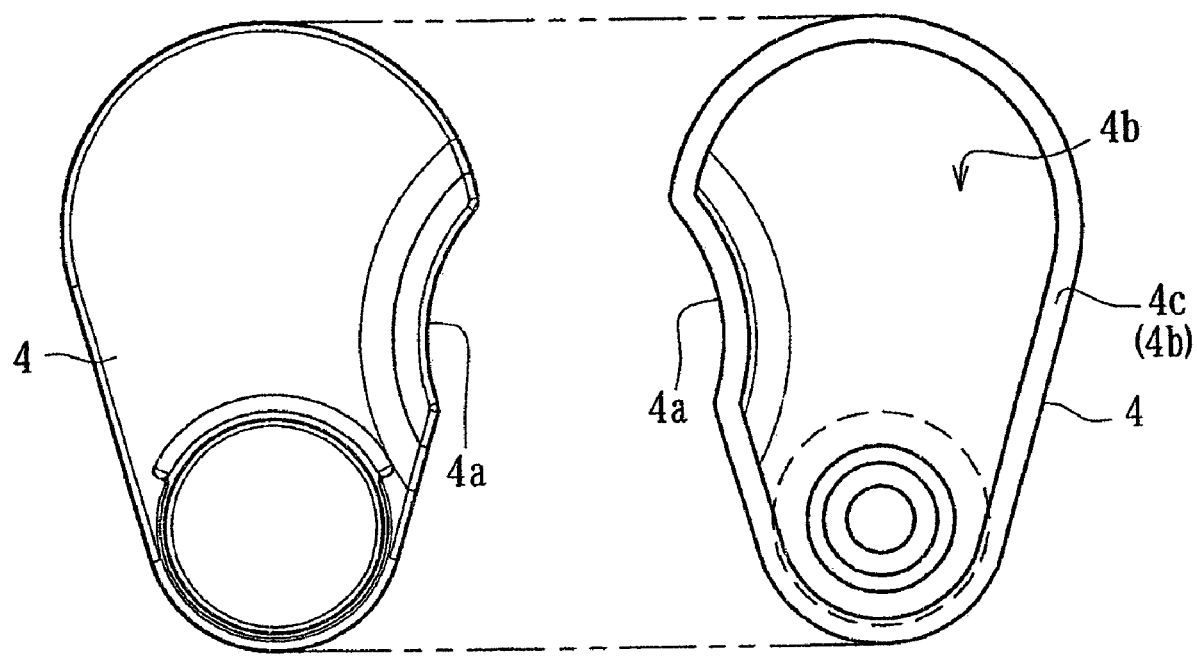
FIG. 8 is a plan view and a rear view of the shutter in the ignition switch device.

As shown in FIG. 8, a convex shape 4c is formed along the contour edge in the rear surface 4b of the shutter 4 related to the present embodiment. Such a convex shape 4c is a shape obtained by forming the shutter 4 such that portions other than the contour edge is thinned, and the protruding end of the convex shape is made flat while the height dimension of the convex shape is made uniform. In addition, the protruding end of the convex shape 4c will also constitute a portion of the rear surface 4b of the shutter 4.

Thereby, the shutter 4 will rotate while making the rear surface 4b (protruding end of the convex shape 4c) thereof contact the protruding end of the protruding portion 7. As a result, smooth rotation of the shutter 4 can be performed, and the surface 3a of the case 3 can be kept from being scratched, thereby maintaining design quality. That is, during the rotation of the shutter 4, the rear surface 4b of the shutter 4 will contact only the protruding end of the protruding portion 7. As a result, a place to which any scratches are given will be limited, and the scratches will not be conspicuous. Therefore, the design quality of the surface 3a of the case 3 can be maintained.

In addition, since the rear surface 4b contacts and is supported by the protruding end of the protruding portion 7 during the rotation, the shutter 4 prevents a gutter or the like from being generated, and makes it possible to perform more smooth rotation over a prolonged period of time. Further, the protruding portion 7 related to the present embodiment is formed such that its protruding end is sharpened. Thus, during the rotation of the shutter 4, the rear surface 4b (protruding end of the convex shape 4c) of the shutter 4 will contact only the sharpened protruding end of the protruding portion 7. As a result, even if any scratches are given, they will not be conspicuous. Therefore, the design quality of the surface 3a of the case 3 can be maintained more reliably.

Particularly, in the present embodiment, the convex shape 4c is formed along the contour edge of the rear surface 4b of the shutter 4. Thus, while the shutter 4 rotates, only the convex shape 4c of the shutter 4 and the protruding end of the protruding portion 7 will contact each other. As a result, the contact area therebetween can be reduced to further keep the surface 3a of the case 3 from being scratched. Further, when the rear surface 4b of the shutter 4 freezes during a winter season, only the convex shape 4c of the shutter 4 and the protruding end of the protruding portion 7 contact each other, the contact area therebetween is small and the frozen place is extremely limited. Thus, the shutter 4 can be rotated with slight force.

The protruding portion 7 is formed so as to extend in an arc along the locus of rotation of the shutter 4. Thus, a three-dimensional design can be provided so as to indicate the rotation direction of the shutter 4, and the rotational operation of the shutter can be made smoother. In addition, the protruding portion to be formed in the surface 3a of the case 3 has only to be formed within the range of rotation of the shutter 4, and may be formed so as to extend substantially linearly.

In addition, in the present embodiment, a driver who is going to start the engine finds the key hole not with his/her eyes, but with his/her hand. If the tip Ka of the ignition key K abuts on the surface 3a of the case 3, is suitably moved along the surface 3a as it is, and thereby inserted into the main guide shape 5 or the auxiliary guide shape 6, the tip Ka is guided to the shutter 4 which covers the insertion hole 3b along the main guide shape 5 and the auxiliary guide shape 6. Then, if the tip is further moved in this direction from the state where it abuts on the cutout 4a of the shutter 4, the shutter 4 can be rotated and be guided to the key hole 2a.

Although the present embodiment has been described hitherto, the invention is not limited thereto. For example, the main guide shape 5 and the auxiliary guide 6 may not be formed, but only the protruding portion 7 may be formed with the range of rotation of the shutter 4. Further, in the present embodiment, the convex shape 4c formed along the contour shape is formed in the rear surface 4b of the shutter 4. However, the rear surface 4b of the shutter 4 may be flat.

Furthermore, although the protruding portion 7 is formed such that its protruding end is sharpened, the protruding end may have a flat shape having a minute width. Even in this case, during the rotation of the shutter, the rear surface of the shutter will contact only the protruding end of the protruding portion. As a result, a place where any scratches are given will be limited to the minute width of the protruding end, and the scratches will not be conspicuous. Therefore, the design quality of the surface 3a of the case 3 can be maintained.

In addition, industrial machines to which the invention can be applied include, for example, various machines, such as bulldozers, scrape dozers, hydraulic shovels (backhoes, power shovels, etc.), and tractors with a crane apparatus.

The invention can also be applied to ones whose appearance shapes are different or to ones to which other functions are added so long as it is an ignition switch device provided with the protruding portion which is formed within the range of rotation of the shutter while protruding from the surface of the case and whose protruding end contacts a rear surface of the shutter while the shutter rotates.

While description has been made in connection with specific embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. An ignition switch device for an industrial machine to start and stop an engine of the industrial machine, the ignition switch device comprising:
   a switching means having a key hole allowing a regular ignition key to be inserted thereinto, and capable of being rotationally operated in a predetermined direction with the inserted ignition key to start and stop the engine of the industrial machine;
   a case covering the switching means and formed with an insertion hole allowing the key hole to face the outside;
   a shutter disposed on a surface of the case, and rotatable between a closed position where the insertion hole of the case is closed and an open position where the insertion hole is opened to allow the key hole to face outside;
   a protruding portion formed within the range of rotation of the shutter and protruding from the surface of the case, whose protruding end being in contact with a rear surface of the shutter while the shutter rotates; and
   wherein the shutter comprises a cutout that is adapted to guide a tip of the ignition key into the key hole during rotation of the shutter.

2. The ignition switch device according to claim 1, wherein the protruding portion has a protruding end which is sharpened.

3. The ignition switch device according to claim 1, wherein a convex shape is formed along a contour edge of the rear surface of the shutter.

4. The ignition switch device according to claim 1, wherein the protruding portion comprises a continuously extending part corresponding to a whole rotatable range of the shutter in an arc along the locus of rotation of the shutter.

5. The ignition switch device according to claim 1, wherein the case includes a groove to form a guide that extends substantially linearly from an edge of the case to the insertion hole.

6. The ignition switch device according to claim 5, wherein the groove is configured such that the width becomes narrow toward the insertion hole from the edge of the case.

7. The ignition switch device according to claim 4, wherein a distance from a rotation center of the shutter to the protruding portion is substantially constant within said part.

* * * * *